(12) United States Patent
Cohen et al.

(10) Patent No.: US 11,776,237 B2
(45) Date of Patent: Oct. 3, 2023

(54) MITIGATING PEOPLE DISTRACTORS IN IMAGES

(71) Applicant: Adobe Inc., San Jose, CA (US)

(72) Inventors: Scott David Cohen, Cupertino, CA (US); Zhihong Ding, Davis, CA (US); Zhe Lin, Fremont, CA (US); Mingyang Ling, Sunnyvale, CA (US); Luis Angel Figueroa, Pittsburgh, PA (US)

(73) Assignee: Adobe Inc., San Jose, CA (US)

( * ) Notice: Subject to any disclaimer, the term of this patent is extended or adjusted under 35 U.S.C. 154(b) by 107 days.

(21) Appl. No.: 16/997,364

(22) Filed: Aug. 19, 2020

(65) Prior Publication Data

US 2022/0058777 A1 Feb. 24, 2022

(51) Int. Cl.
| | |
|---|---|
| *G06V 10/46* | (2022.01) |
| *G06T 5/00* | (2006.01) |
| *G06V 40/10* | (2022.01) |
| *G06V 40/16* | (2022.01) |
| *G06F 18/241* | (2023.01) |

(52) U.S. Cl.
CPC .......... *G06V 10/464* (2022.01); *G06F 18/241* (2023.01); *G06T 5/005* (2013.01); *G06V 40/10* (2022.01); *G06V 40/161* (2022.01); *G06T 2207/20081* (2013.01); *G06T 2207/30201* (2013.01)

(58) Field of Classification Search
CPC .......... G06T 5/005; G06T 2207/20081; G06T 2207/30201; G06K 9/00228; G06K 9/00362; G06K 4/4676; G06K 9/6268

USPC ......................................................... 382/205
See application file for complete search history.

(56) References Cited

U.S. PATENT DOCUMENTS

| | | | | |
|---|---|---|---|---|
| 8,515,139 | B1 * | 8/2013 | Nechyba .............. | G06K 9/6256 382/118 |
| 2005/0031225 | A1 * | 2/2005 | Sellers .................. | G06T 11/001 382/275 |
| 2005/0147277 | A1 * | 7/2005 | Higaki ................... | G06V 40/10 382/103 |
| 2018/0241951 | A1 * | 8/2018 | Hirabayashi ........... | H04N 5/272 |

OTHER PUBLICATIONS

Fried, O., Shechtman, E., Goldman, D. B., & Finkelstein, A. (2015). Finding distractors in images. In Proceedings of the IEEE Conference on Computer Vision and pattern Recognition (pp. 1703-1712).

\* cited by examiner

*Primary Examiner* — Mark Roz
(74) *Attorney, Agent, or Firm* — Shook, Hardy & Bacon L.L.P.

(57) ABSTRACT

Systems, methods, and software are described herein for removing people distractors from images. A distractor mitigation solution implemented in one or more computing devices detects people in an image and identifies salient regions in the image. The solution then determines a saliency cue for each person and classifies each person as wanted or as an unwanted distractor based at least on the saliency cue. An unwanted person is then removed from the image or otherwise reduced from the perspective of being an unwanted distraction.

20 Claims, 11 Drawing Sheets

MITIGATING PEOPLE DISTRACTORS IN IMAGES

TECHNICAL FIELD

Various embodiments of the present invention relate to technical solutions for removing unwanted people from images.

BACKGROUND

Distractors are the regions in images that draw attention away from the main subjects of an image and therefore reduce overall image quality. Examples of distractors include signs that are present in a photo of a landscape, the presence of an unwanted person in a photo of a landmark, or a small portion of an object intruding at the corner of a photo.

Techniques exist for automatically removing distractors from images, although they do not work very well with people functioning as distractors. One solution employs a machine learning model trained on ground-truth (human annotated) images to identify distractors of any type. The model creates a distractor map of an image that identifies the objects in an image and predicts a degree to which each object is likely a distractor. An adjustable threshold is set in some scenarios to remove those objects predicted to be distractors to a degree that exceeds the threshold.

A problem arises, however, when the model removes a person from a photo who was positioned relatively far from the camera, even though the photographer intended for the person to be in the photo. The opposite problem arises when an unwanted person close to the camera is not removed, because the model does not classify the person as a distractor.

Another technique automatically removes people from landscape images by comparing multiple images taken in series and eliminating moving objects from the final image. This solution works well under precise circumstances such as when the background is visible in at least half the frames but can err on the side of removing people who were intended by the photographer to be the subject of the image.

Of course, manually editing a photo has always been a solution to the problem of distractors but it is very time consuming and laborious. Manual editing is especially ill suited for removing unwanted people from a large set of images such as a user's personal collection of photographs.

SUMMARY

Systems, methods, and software are described herein for mitigating people distractors in images. A distractor mitigation solution implemented in the hardware, software, and/or firmware of one or more computing devices functions to identify and remove unwanted people distractors from images.

Various implementations of the proposed distractor mitigation detect people in an image of a scene and identify one or more salient regions of the image. For at least a person of the one or more people, the implementations determine a salience cue indicative of an overlap of the person with the one or more salient regions of the image. The person is then be classified as an unwanted distractor based on one or more cues that include the salience cue determined for the person. People classified as unwanted distractors are removed in some cases from a version of the image such as the original image, a copy of the image, or the like.

This Brief Summary is provided to introduce a selection of concepts in a simplified form that are further described below in the Detailed Description. This Overview is not intended to identify key features or essential features of the claimed subject matter, nor is it intended to be used to limit the scope of the claimed subject matter.

BRIEF DESCRIPTION OF THE DRAWINGS

Many aspects of the disclosure are better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
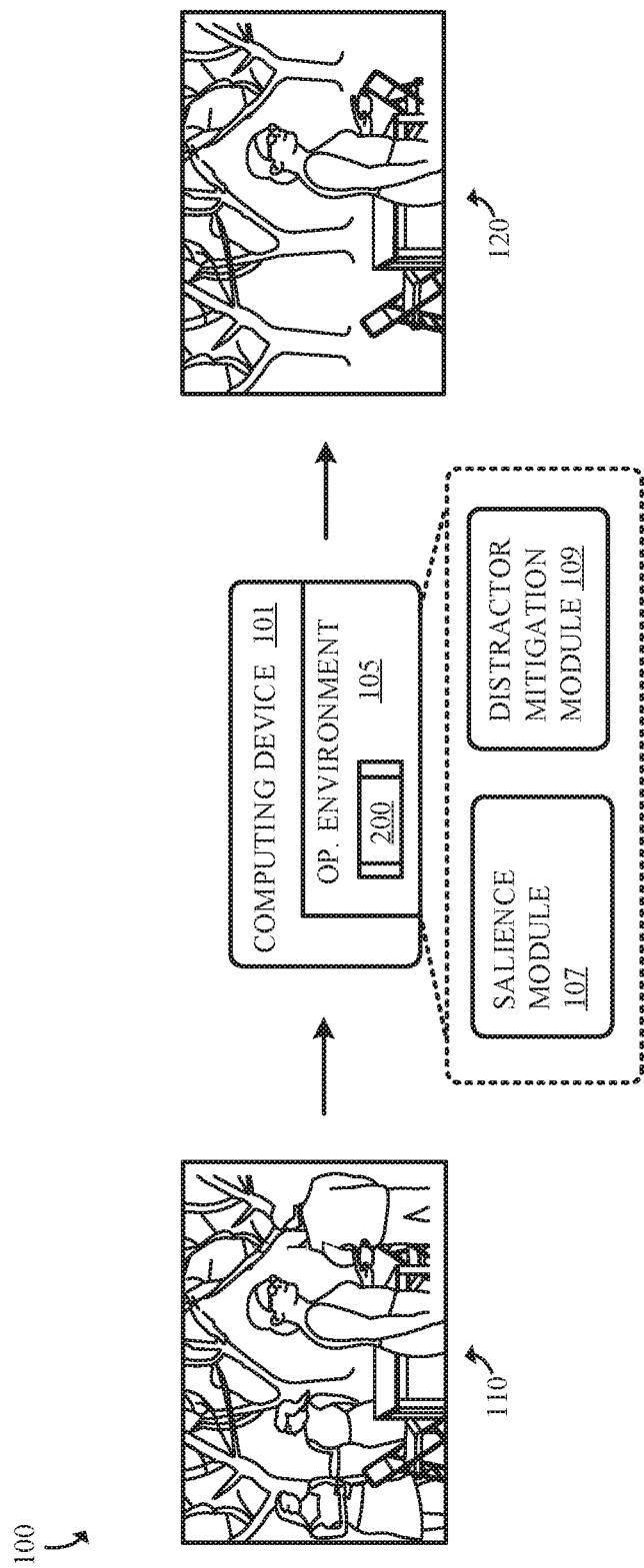
FIG. 1 illustrates an operational example of distractor mitigation in an implementation.

Technology for mitigating people distractors in images is disclosed herein. In various implementations, one or more computing devices employ a new distractor mitigation technique to automatically identify and remove unwanted people in images. Removing the unwanted person in an image (e.g. a photo) included blurring the person, removing the person and replacing those pixels with background pixels, or otherwise modifying the region in the photo so as to lessen the distraction caused by the unwanted person. The enhanced distractor mitigation technique disclosed herein detects people in an image and identifies salient regions of the image. The distractor mitigation technique classifies given person as an unwanted distractor based on an overlap of the person with one or more of the salient regions.

The extent to which a person overlaps with salient regions in the image is captured in a salience cue. The distractor mitigation technique uses the salience cue alone or in combination with one or more other cues to classify the person as wanted or as an unwanted distractor. The person is retained in the image if classified as wanted. However, the person is removed from a version of the image if classified as an unwanted distractor. The version of the image from which the person is removed is the original image in which the person is detected, a copy of the image, or the like.

The other cues that are used to classify the person include a recognition cue and a distractor cue. The recognition cue indicates whether the person is recognized, and the distractor cue indicates a probability that the person is a distractor in the image. The recognition cue is determined by a recognition engine, for example, while the distractor cue is produced using a distractor map of the image.

In some implementations, the distractor cue includes a score indicative of an extent to which a portion of the image that includes at least a portion of the image overlaps with distractor regions in the image. The distractor map, for example, includes a score for each pixel in the image indicative of the extent to which a given pixel is part of a distractor. The score for the potentially unwanted person is the result of a calculation involving the scores for the pixels in the portion of the image corresponding to the potentially unwanted person. For example, the pixel scores are summed, averaged, or otherwise operated upon to obtain a score that is used heuristically, in a learned manner, or otherwise to ascertain whether to classify the person as an unwanted distractor.

Other cues that factor into the determination of whether the person is wanted or unwanted include—but are not limited to—a posture cue (indicative of the body posture of the person in the image), an orientation cue (whether the person is facing toward or away from the camera), and any other possible cues that inform the determination.

A single cue or a combination of two or more cues drive the determination of whether a person is wanted or unwanted in the image. In some examples, the strength of one cue overwhelms the effect of any other cues. In other examples, no single cue is determinative but rather, a combination of cues weighs the determination in one direction or the other. In still other examples, the recognition cue suffices on its own to determine whether a person in an image is wanted or unwanted.

For example, in some solutions the people in an image are detected and then evaluated to determine whether each person is known or unknown. A resulting recognition cue determined for each person then drives a recommendation engine to recommend via a user interface whether remove or keep a given person.

The The distractor mitigation technique removes unwanted people from the image(s) automatically or at the direction of a user. For example, a user supplies input via the user interface either confirming or rejecting the recommendations of the engine. In this example, the solution operates without other cues, including the saliency cue, but rather relies entirely on the recognition cue to classify a person as wanted or unwanted. In some implementations, a user interface is displayed to a user to optionally correct the automatic determination of wanted or unwanted on each detected person before removing unwanted persons from the image Once a given person has been classified as unwanted and removed from one image, recurring instances of the same person in other images could be automatically removed from the other images by the distractor mitigation technique without further input from the user. In addition, the entire process runs automatically on a set of images in a directory, saving out a new version of any image for which there is a detected person which is classified as unwanted and therefore removed.

The term "salient region(s)" refers to those that are visually more conspicuous by virtue of their contrast with respect to surrounding regions. Salient regions are also identified or characterized by their relative position within an image (centered or at the edges), whether they are in-focus or out-of-focus, and whether they are in the foreground or in the background, as well as by any other suitable characteristic.

The term "salience cue" refers to the extent to which a captured person in an image overlaps with salient regions in the image.

Figure 9:
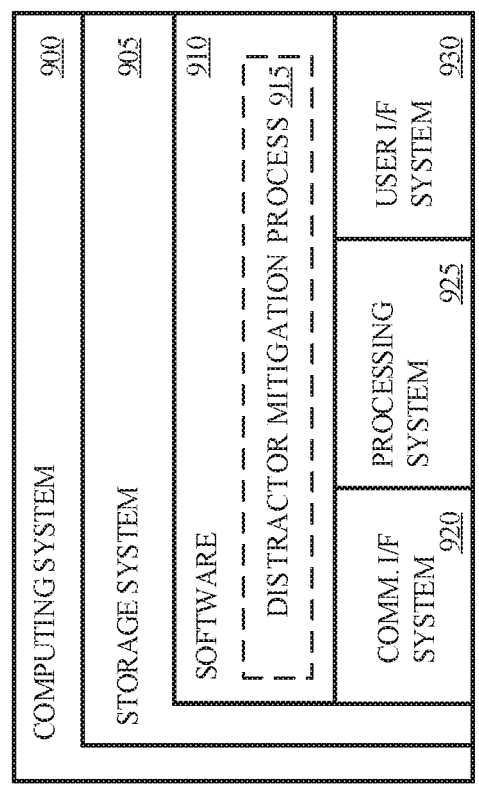
FIG. 9 illustrates a computing system suitable for implementing the various operational environments, modules, architectures, processes, scenarios, and sequences discussed below with respect to the Figures.

Referring now to the drawings, FIG. 1 illustrates an implementation 100 that is exemplary of the enhanced distractor mitigation technique proposed herein. Implementation 100 includes computing device 101 having an operating environment 105. Operating environment 105 includes a salience module 107 and a distractor mitigation module 109 for performing distractor mitigation process 200. Examples of computing device 101 include, but are not limited to, desktop and laptop computers, server computers, mobile devices (e.g. phones and tablets), and cameras, of which computing system 900 in FIG. 9 is representative.

Figure 2:
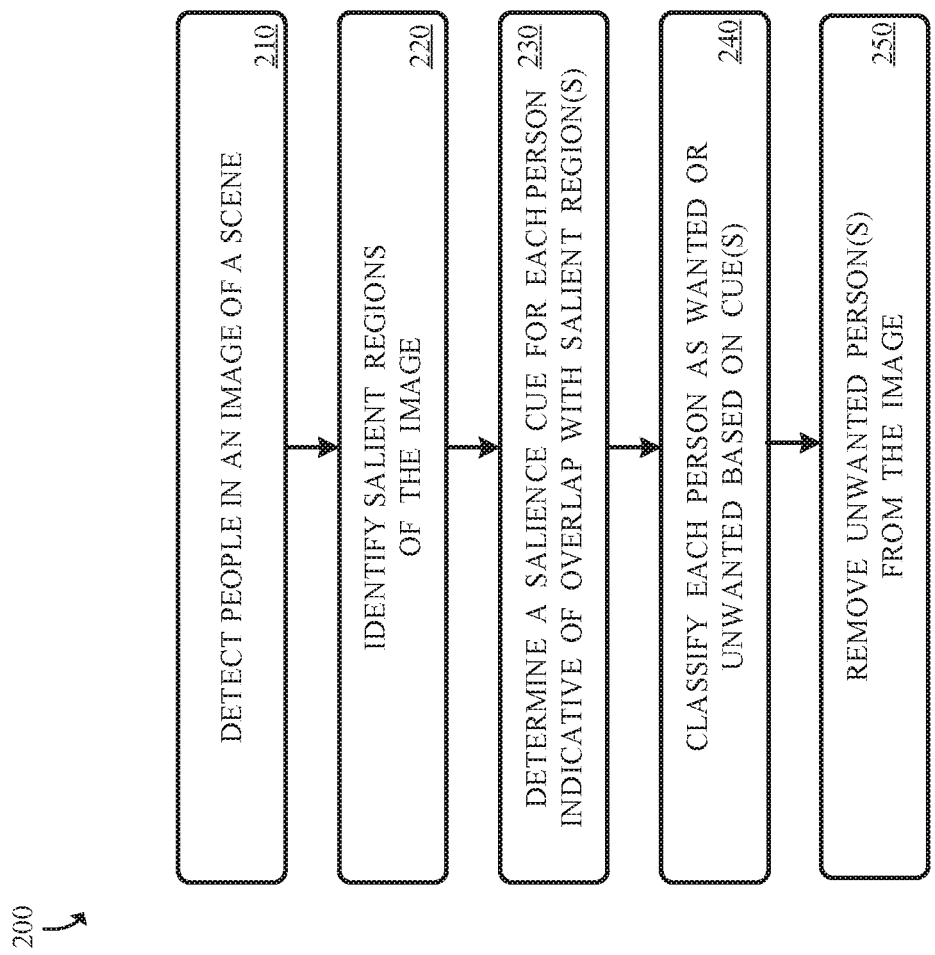
FIG. 2 illustrates a distractor mitigation process in an implementation.

Salience module 107 and distractor mitigation module 109 are each implemented in program instructions and are executed by the hardware elements of computing device 101. When executed by the hardware elements of computing device 101, the program instructions of salience module 107 and distractor mitigation module 109 direct computing device 101 to operate as described for distractor mitigation process 200, referring parenthetically to FIG. 2.

In operation, salience module 107 detects one or more people in an image of a scene (step 210). The person or people are identified using object detection techniques capable of scanning an image, identifying objects in the image, and discriminating between people and other types of objects.

Next, salience module 107 identifies one or more salient regions in the image (step 220). Salient regions are those that are visually more conspicuous by virtue of their contrast with respect to surrounding regions. Salient regions are also identified or characterized by their relative position within an image (centered or at the edges), whether they are in-focus or out-of-focus, and whether they are in the foreground or in the background, as well as by any other suitable characteristic. A saliency filter is employed at various scales to generate a saliency map segmented into regions graded according to their saliency. The different regions are graded in a binary manner (e.g. salient vs. not salient) or in a gradual manner (e.g. a sliding scale of saliency).

Distractor mitigation module 109 then determines a saliency cue for each person detected in the image based on an overlap of the person with the salient regions (step 230). The saliency cue indicates an extent or degree to which a mask of a detected person overlaps with one or more salient regions in the image. In another example, the saliency cue is a composite value representative of the saliency values of the pixels in the mask of the person. In still another example, the saliency cue is a value that expresses a probability that a pixel or group of pixels belong to a subject of an image.

As mentioned, other cues are leveraged in addition to the saliency cue in some cases. For example, the other cues include a recognition cue, a distractor cue, a posture cue, and orientation cue, and the like. The recognition cue is determined by a facial recognition engine that outputs a classification of the person as known or unknown. The classification is relative to a corpus of images belonging to a user account associated with the image. The distractor cue is determined using a distractor map that indicates a probability for each object in the image that the object is a distraction.

Distractor mitigation module 109 classifies the person as wanted or as an unwanted distractor based on at least the saliency cue (step 240). In some implementations, all the cues are submitted to the classification step, but one has more impact on the classification than any other. For instance, if a recognition cue indicates a strong recognition value, such a value out-weighs or overwhelms the contribution of the saliency cue and the distractor cue, even if the saliency cue and the distractor cue are also strong.

In other examples, the recognition cue indicates that a person is novel (unknown), but the saliency cue indicates strongly that the person is the subject of the image. At the same time, the distractor cue is weak or non-existent. Under such circumstances, the subject cue overwhelms the others and produces a result where the person is kept in the image. Many combinations of cues and their influences on the classification of wanted versus unwanted are possible and are within the scope of the present disclosure.

If a person is classified as wanted, then distractor mitigation module 109 keeps the person in the image. If, however, the person is classified as an unwanted distractor, distractor mitigation module 109 removes or reduces the influence of the person in a version of the image (step 250). This is done by, for example, blurring the person or replacing the person with background pixels. The version of the image is the original version, a copy of the image, or the like.

Referring to the scene illustrated in FIG. 1, computing device 101 as directed by distractor mitigation process 200 takes images as input and removes or otherwise reduces the distraction caused by unwanted people in the images. The resulting output images therefore lack the presence of unwanted interlopers such as tourists and other bystanders. Image 110 in FIG. 1 is an example input image, while image 120 is representative of an output image.

Figure 3:
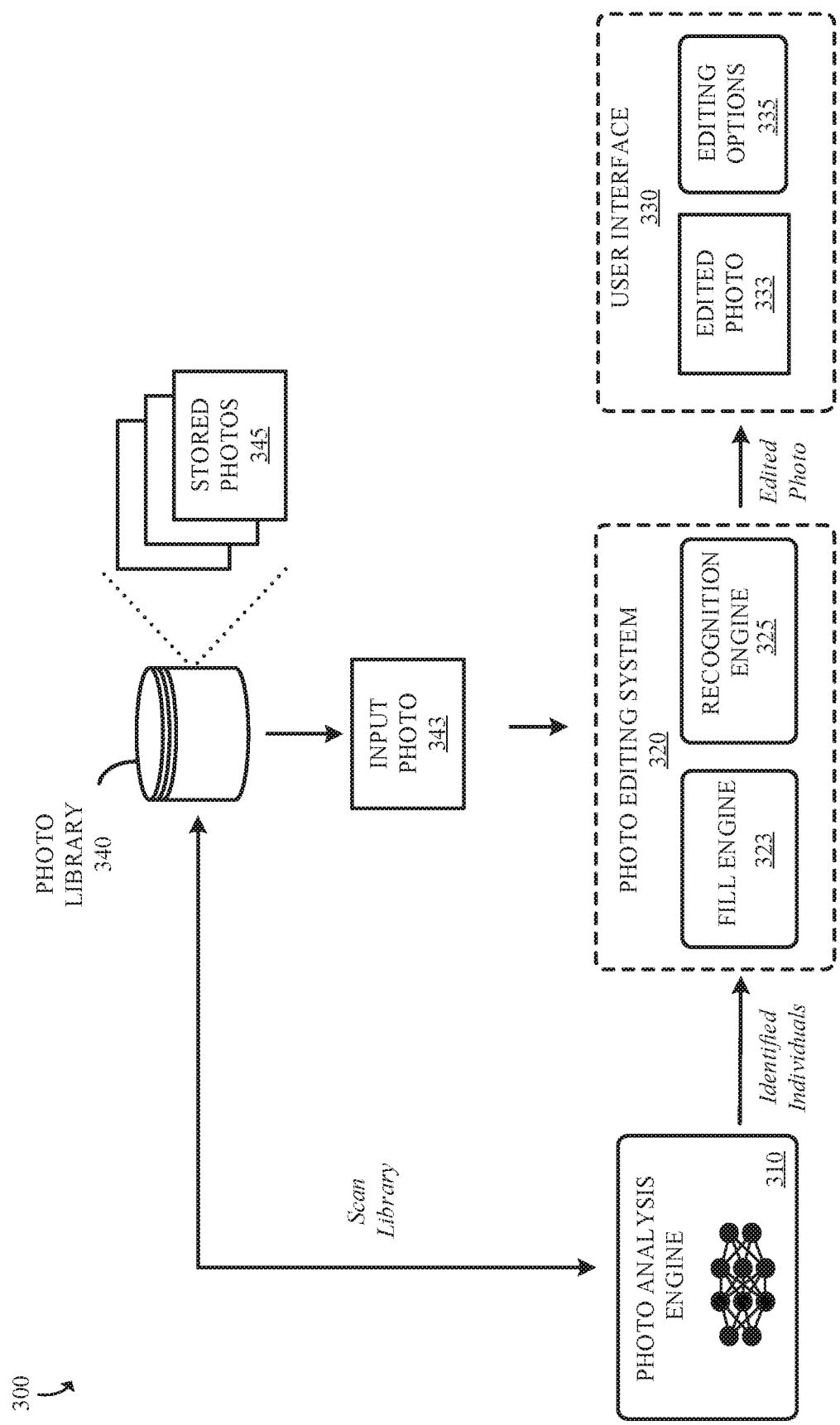
FIG. 3 illustrates an example operating environment in an implementation.

FIG. 3 is an example of a personalized and automated editing system in accordance with one or more embodiments of the present technology. FIG. 3 includes operational architecture 300. Operational architecture 300 further includes photo analysis engine 310, photo editing system 320, user interface 330, and photo library 340. Operational architecture 300 exist as a single software application operating on one or more computing devices. In contrast, operational architecture 300 can exist as a distributed software application operating on more than one computing device.

Photo analysis engine 310 is operatively coupled to photo editing system 320 and photo library 340. In some embodiments, photo analysis engine 310 is implemented as program instructions executed on one or more computing devices such as personal computers, server computers, smart phones, tablet computers, or other types of computing device. Photo library 340 is representative of a file directory stored on one or more storage devices such as solid-state drives, hard disk drives, cloud storage systems, and the like.

In operation, photo analysis engine 310 scans stored photos 345 of photo library 340 to identify one or more reoccurring individuals in stored photos 345. In some embodiments, photo analysis engine 310 determines a person is a reoccurring person by measuring the frequency at which they appear in stored photos 345. Based on the frequency of which a person appears in stored photos 345, a person is identified as a known person. Alternatively, a user supplies photo analysis engine 310 with photos that include desired people exclusively or that have desired people tagged.

In other embodiments, photo analysis engine 310 determines multiple distinctive attributes of the reoccurring people, one or more of which factor into describing a person such that they can be recognized later in other images. For example, photo analysis engine 310 performs facial recognition on the reoccurring people based on one or more recognizable characteristics of the people such as facial characteristics of the people. Photo analysis engine 310 additionally determines hair styles, hair colors, clothing, body shape, and/or skin tone of the reoccurring people. Each distinctive attribute identified by photo analysis engine 310 in some cases is tied to a specific reoccurring individual. In some embodiments, photo analysis engine 310 employs machine learning techniques to identify reoccurring people in stored photos 345. Machine learning techniques include, but are not limited to, deep neural networks, artificial neural networks, random forests, k-nearest neighbors, and other similar models. The machine techniques are updated or trained for person recognition people over time.

After identifying reoccurring people in stored photos 345 of photo library 340, photo analysis engine 310 relays the identified distinctive features of the reoccurring people to photo editing system 320. Upon receiving the identified distinctive features of the reoccurring people, photo editing system 320 classifies the reoccurring people as known people for use during photo editing.

Photo editing system 320 includes fill engine 323 and recognition engine 325. Photo editing system 320 is representative or one or more software systems operating on a computing device and is configured to ingest input photo 343 from photo library 340. Input photo 343 includes for exemplary purposes one or more known people to be kept in the photo and one or more unwanted people to be edited out or otherwise removed from input photo 343.

After photo editing system 320 receives input photo 343, recognition engine 325 analyzes input photo 343 to determine if any of the known people are included in input photo 343. In other embodiments, recognition engine 325 determines a subject of the image and the subject is any number of prominent people in the image or the focus of the camera when the image was captured. In some examples, the subject of the image is an object or landmark instead of a person. When the subject of the photo is identified, recognition engine 325 marks all people not identified as the subject of the image for removal by fill engine 323.

In other embodiments, recognition engine 325 identifies each person in the photo and then performs facial recognition on each identified person in the photo. Upon performing facial recognition on every individual, recognition engine 325 determines if each person is a known person or an unknown person. Recognition engine 325 cross references facial recognition results generated by photo analysis engine 310 to determine if any people in input photo 343 are known people. Once all people in input photo 343 are identified as either known or unknown, recognition engine 325 marks all unknown people for removal by fill engine 323. Recognition engine 325 also identifies pixels associated any unknown people and mark that specific set of pixels for removal from the image.

In further embodiments, recognition engine 325 employs machine learning or deep learning techniques, to predict a person distractor map where at each pixel of input photo 343 there is a probability that indicates the pixel is part of an unwanted or unknown person. Recognition engine 325 measures the overlap between the distractor map and the identified people in input photo 343 and mark identified people for removal based on the overlap.

Constructing a distractor map is not limited to distractor people in images but in some implementations is implemented to predict distracting objects and the like. In further embodiments, recognition engine 325 trains a neural network to detect unwanted people directly. For example, recognition engine 325 creates detection boxes on input photo 343 that encompass pixels associated with unwanted people and score each person detection by its overlap with unwanted person detections. Recognition engine 325 then uses this overlap to determine which people to remove from the photo.

Once recognition engine 325 has identified each person in input photo 343 and determined which people of input photo 343 need to be removed, fill engine 323 removes all people marked for removal. Fill engine 323 edits out any person or object marked for removal in input photo 343. In some examples, fill engine 323 removes all pixels from input photo 343 and replaces the removed pixels with pixels that align with the background of the input photo 343.

Fill engine 323 is not limited by the method of editing. For example, fill engine 323 in some examples crops input photo 343 to remove any unwanted people. In some cases, cropping input photo 343 or removing unwanted people from input photo 343 is not be feasible. In such cases, fill engine 323 blurs or camouflages unwanted people in input photo 343. Fill engine 323 is capable of using any combination of editing techniques to remove or reduce the prominence of people of objects in input photo 343 marked for removal by recognition engine 325. When fill engine 323 has finished editing input photo 343, photo editing system 320 sends the edited photo to user interface 330.

User interface 330 represents a guided user interface for presenting images and allowing user control over the editing of images. User interface 330 includes a view of edited photo 333 and includes editing options 335. User interface 330 is includes program instructions executed on a computing system such as a personal computer, laptop computer, smartphone, or other similar device, to render its included view and options. User interface 330 is displayed on a computer monitor or other type of screen to enable user interaction. User interface 330 is not limited to presenting edited photo 333. Rather, user interface 330 in some embodiments presents views of multiple versions of edited photo 333, assuming photo editing system 320 creates the multiple versions.

Editing options 335 allow a user the ability to customize the editing process for creating edited photo 333. Editing options 335 in some examples allows a user to select which photo or photos of stored photos 345 for editing by photo editing system 320. In some examples, editing options 335 includes one or more menus which allow a user to individually select which people in an edited photo to keep or remove. For example, if photo editing system 320 inadvertently removes an individual a user wishes to keep, editing options 335 provides a user with the ability to correct such mistakes.

Figure 4:
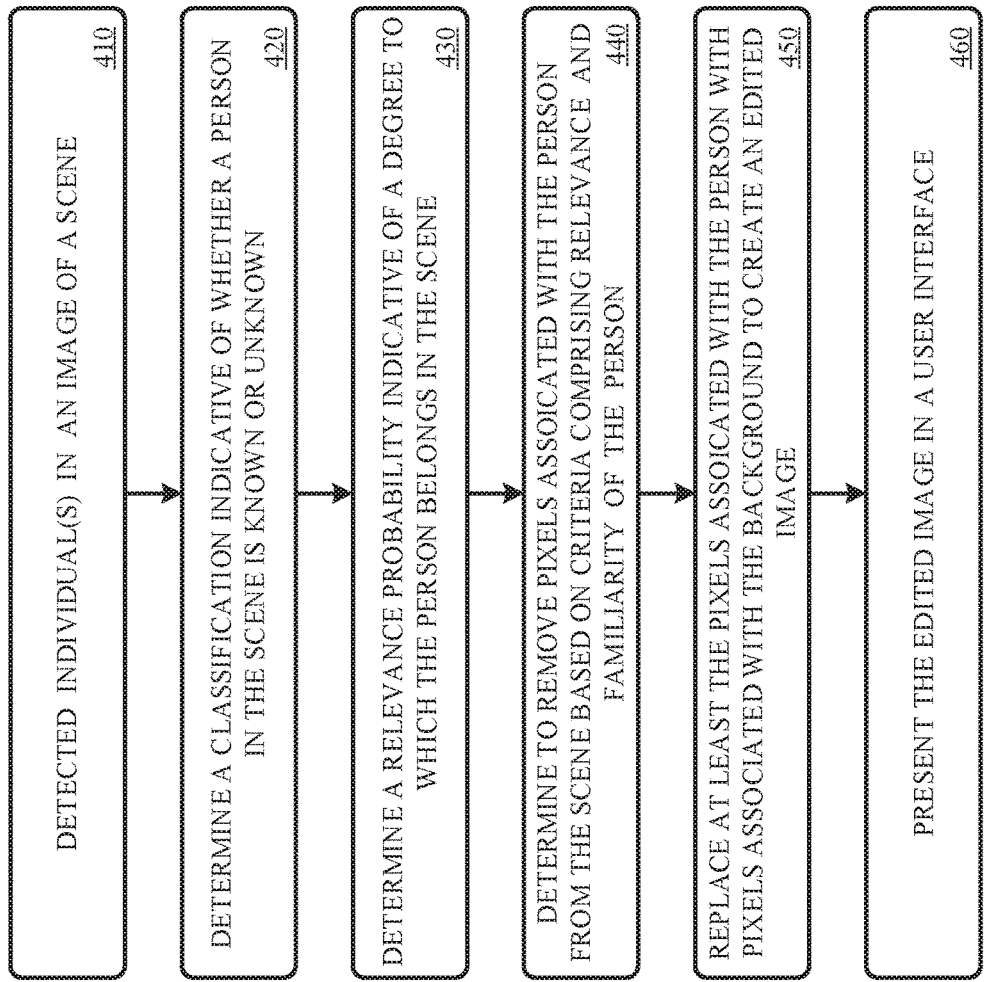
FIG. 4 illustrates a distractor mitigation process in an implementation.

FIG. 4 is a flowchart illustrating photo editing process 400 according to one or more embodiments of the present technology. Photo editing process 400 is a fully automated or semi-automated process for removing unwanted people from photographs.

In operation, a computing device employing photo editing process 400 detects one or more individuals in an image of a scene (step 410). The image is captured live or is retrieved from a photo library for editing. The photo library (e.g., photo library 340) in some examples is a file directory stored on one or more storage devices of the computing device. The image includes one or more distractors such as tourists that a user wishes to remove from the image.

Once captured, a photo editing program (e.g., photo editing system 320) determines a classification indicative of whether a person in the scene is known or unknown (step 420). In some embodiments, determining whether a person is known or unknown includes performing facial recognition on the person. The photo editing program identifies regions of pixels in the image that encompass each person to create a person mask. Each person mask created by the photo editing program is used to identify a single individual. Similarly, when performing facial recognition on the image, the photo editing program identifies regions of pixels in the image that encompass the face of a person to create a facial mask for each person. Each facial mask created by the photo editing program fully encompasses the face of each identified person.

The photo editing program further determines a relevance probability indicative of a degree to which the person belongs in the scene (step 430). In some embodiments, the photo editing program assigns a probability to each pixel of the image that indicates if the pixel belongs in the scene. For example, each pixel in the image is assigned a probability between 0 and 1 indicating the likelihood that the pixel is part of the subject of the photo. The relevance probability determines which people in the image are the subject or primary target of the photograph.

In alternative embodiments, the photo editing program determines that the subject of the image is not a person but is instead an object or landmark such as a building. In some embodiments, determining the subject of the photo includes subject mapping the image to determine which areas of the image include the subject of the photo. The photo editing system then scores each identified person by measuring the overlap between a person mask and the subject mapping of the image. Additionally, the photo editing system determines the pose of an individual to determine the subject of the photo. For example, a person who is facing forward in the image (i.e., toward the camera that captured the image) is classified as a subject of the image.

After people in the image have been classified and the relevance probability has been determined, the photo editing program determines to remove pixels associated with the person from the scene based on criteria including the familiarity of the person (known vs. unknown) and the relevance probability (step 440). In some embodiments, the photo editing system locates each person mask that includes an unknown person and removes image pixels encompassed by the person mask. The photo editing program determines in some cases that the relevance probability of the pixels within the person mask indicates the person is not the subject of the photo and then removes the person.

In some examples, the person mask includes an excess of pixels that do not represent a person. In this case, prior to removing the person mask, the photo editing program trims or otherwise reduces the number of pixels included in the person mask to prevent pixels from being edited out that do not represent the unwanted person. In alternative embodiments, the photo editing program determines that a different photo editing technique is more suitable to remove or reduce the prominence or existence of any unknown people in an image.

In some cases, completely removing an unknown person from the photo is not feasible without damaging the image quality of the photo. In these cases, the photo editing program can crop the photo to remove unknown people, blur unknown people, or camouflage unknown people in the image. The photo editing program in some cases automatically determines which method or combination of methods to remove or reduce the prominence of unknown people is most suitable. Alternatively, the photo editing program provides options which allow a user to select which method to use.

In other embodiments, classifying identified people as unknown results when the photo editing program determines that any of the people in the image are not the subject of the photo. In other embodiments, the photo editing program determines that a person is unknown if the face of that person is not recognized during facial recognition. In contrast, if a person's face is recognized, or if the person is determined to be the subject of the photo, then the person is identified as known. The photo editing program relies on additional identifiers besides facial recognition and subject identification to classify each person as known or unknown. For example, the photo editing program in some scenarios examines the hair, clothing, or body shape, in addition to other personal identifiers to ascertain the identity of an individual.

After the unknown individuals are automatically removed from the photo, the photo editing program replaces at least the removed pixels with pixels associated with the background (step 450). In some embodiments, replacing the pixels includes replicating the background pixels to seamlessly integrate the hole formed by removing the pixels. Alternatively, if the photo editing program has access to a similar image, the photo editing program copies the needed pixels of the similar image to fill the hole. It should be appreciated that the method of hole filling is not limited to the examples described herein.

In some implementations, a hole filling technique (e.g. Content Aware Fill or ProFill) takes in an optional argument for areas to avoid when sourcing pixel information to use in the hole filling. For example, the union of the other people (wanted or unwanted) is optionally given as such an "avoid region" input to the hole filling method in order to obtain a better result (since the other people are not background to fill in the hole). A check is also performed to ensure that a hole filling problem is not solved with a hole mask that is the union unwanted people, which is avoided by excluding such regions from the input to the hole filling method.

After the holes have been filled, the photo editing program presents the edited image in a user interface (step 460). In some embodiments, the user interface (e.g., user interface 330) includes options that allow a user to review the edited photo and to direct the photo editing program to make desired changes to the edits. The user interface presents multiple versions of the edited photo (e.g., edited photo 333) in some examples. For example, the photo editing program performs more than one type of removal method on the photo thereby creating multiple versions of the edited photo. The user then selects in the user interface which version of the multiple versions to choose from.

Figure 5:
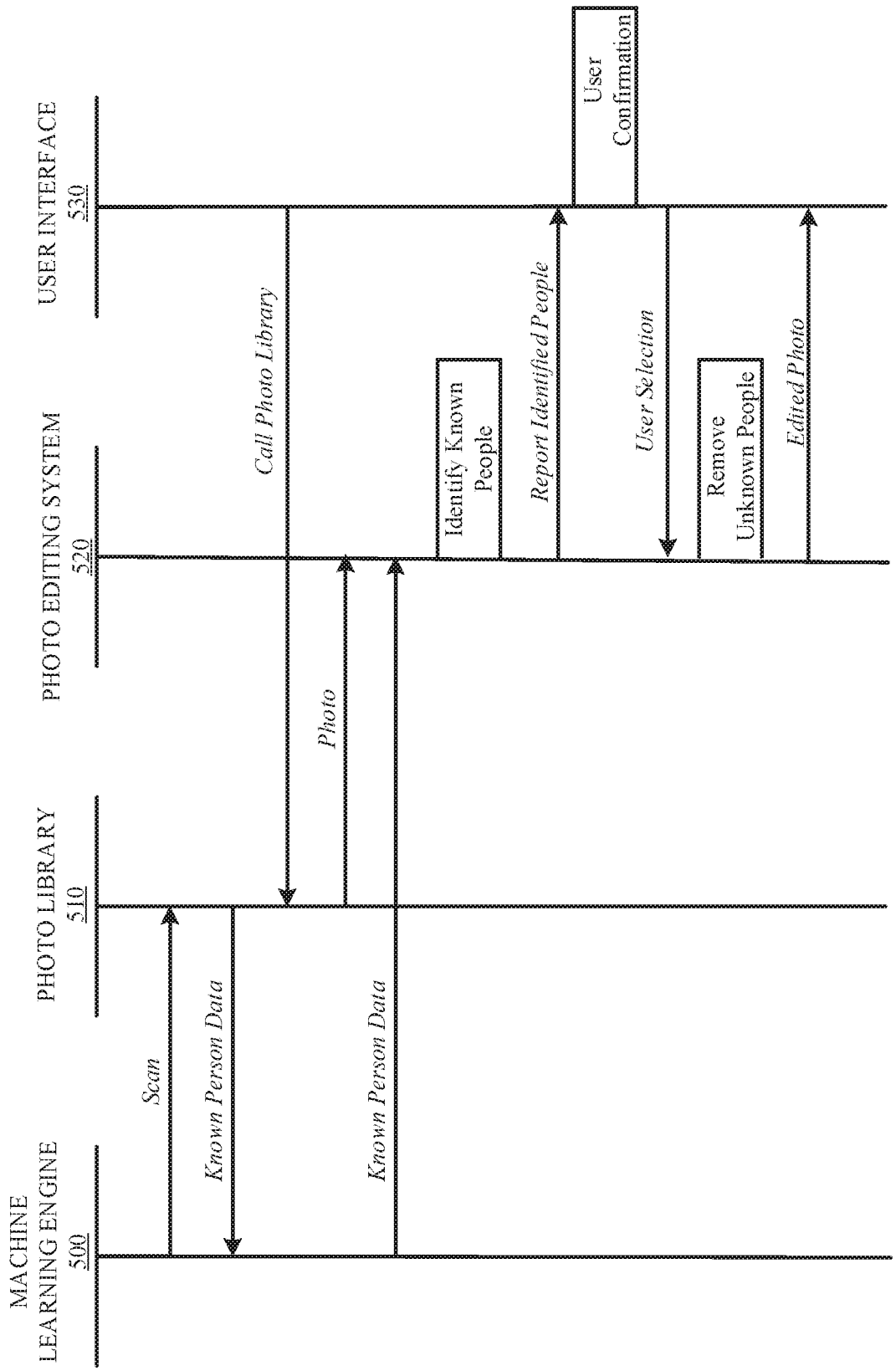
FIG. 5 illustrates a sequence diagram in an implementation.

FIG. 5 is a sequence diagram illustrating an image cleaning process according to one or more embodiments of the present technology and includes machine learning engine 500, photo library 510, photo editing system 520, and user interface 530. Each of machine learning engine 500, photo library 510, photo editing system 520, and user interface 530 are implemented in hardware, software, and/or firmware on one or more computing devices such as personal computers, mobile phones, or other similar devices. The image cleaning process fully automated or semi-automated. In some implementations, the image cleaning process operates asynchronously in the background with respect to a foreground application.

In operation, machine learning engine 500 scans photo library 510 to identify known people in the library. Machine learning engine 500 determines that a person is a known person based on the frequency at which that person appears in photo library 510. When scanning photo library 510, machine learning engine 500 identifies a quantity of attributes describing each known person. For example, machine learning engine 500 identifies facial features, body features, and clothing styles of each person identified as a known person and record this information as known person data. In some examples, each known person is linked to a set of known person data. Machine learning engine 500 then provides the known person data to photo editing system 520. In alternative embodiments, a user feeds images of known people directly to machine learning engine 500 and machine learning engine 500 scans the images to learn the known people in the images.

Either before or after machine learning engine 500 begins scanning photo library 510, user interface 530 calls photo library 510 to retrieve a photo from photo library 510. The call in some examples is a request triggered by user input or triggered by a system setting such that the call occurs automatically. The call directs photo library 510 to send one or more photos to photo editing system 520.

After receiving the call, photo library 510 sends a photo to photo editing system 520. The photo includes one or more individuals to potentially be removed by photo editing system 520. Once received, photo editing system 520 identifies known individuals in the photo. In some embodiments, photo editing system 520 performs facial and person recognition on the photo and utilizes the known person data generated by machine learning engine 500 to identify known individuals in the photo. In other embodiments, photo editing system 520 programmatically identifies the subject of the photo and identifies any known individuals in the photo. Alternatively, photo editing system 520 uses a combination of facial and body recognition as well as subject selection to ascertain any known individuals in the photo.

In some embodiments, once photo editing system 520 has identified the known individuals in the image, photo editing system 520 reports the identified people to user interface 530. Photo editing system 520 presents which individuals in the photo are identified as known individuals and which are unknown. In some examples, photo editing system 520 highlights, within the image, each person with their classifications as either known or unknown.

Once received, user interface 530 allows a user to confirm classifications of each person from photo editing system 520. User interface 530 includes one or more toggles to allow a user to reclassify any individuals identified by photo editing system 520. In an example, photo editing system 520 incorrectly classifies a known person as unknown. In this case, a user operates user interface 530 to fix the incorrect classification. User interface 530 in some examples also includes options to allow a user to customize the type of photo editing to be performed by photo editing system 520. User interface 530 in some examples also includes one or more tool tips that recommend a type of photo editing to be performed by photo editing system 520.

Once the user has confirmed the classifications performed by photo editing system 520, user interface 530 sends the user's selection to photo editing system 520. Photo editing system 520 then edits the photo to remove unknown people based on the user selection. In some embodiments, removing the unknown people includes editing out the unknown individuals from the image and/or reducing the prominence of any unknown individuals in the image. Methods that photo editing system 520 uses to remove unknown people include hole filling, cropping the image, blurring, or camouflaging unknown individuals.

Once the unknown people are removed, the edited photo is returned to user interface 530 for presentation to the user. In some embodiments, photo editing system 520 automatically saves the edited photo to photo library 510. Photo editing system 520 in some examples overwrites the original photo in stored in photo library 510 to ensure duplicate photos do not exist. Alternatively, photo editing system 520 stores the edited photo with a different file name than the original photo and preserve the original photo. The method of storing the edited photo is a user configured setting in user interface 530.

Figure 6:
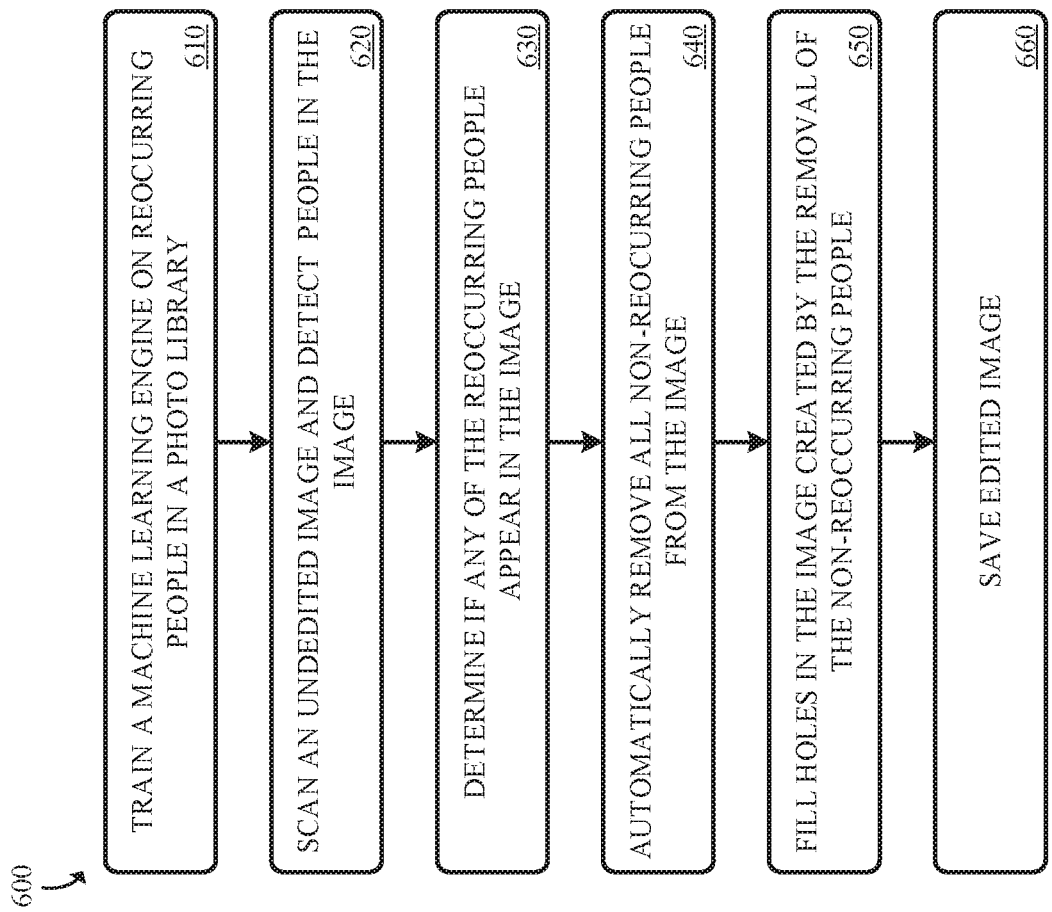
FIG. 6 illustrates a distractor mitigation process in an implementation.

FIG. 6 is a flowchart illustrating an automatic photo editing process, represented by distractor mitigation process 600, according to one or more embodiments of the present technology. Distractor mitigation process 600 is implemented in program instructions executed on one or more computing devices. The program instructions, when executed by one or more processors of a suitable computing device, direct the computing device to operate as described in FIG. 6.

In operation, the computing device trains a machine learning engine on a photo library identify reoccurring people in the photo library (step 610). In some embodiments, the machine learning engine determines that a person is reoccurring by measuring the frequency at which they appear in the photo library. Upon identifying that a person is reoccurring, the machine learning engine identifies a variety of personal identifiers for each reoccurring person. The personal identifiers include, but are not limited to, facial recognition data, hair styles, hair colors, body shape, skin tone, or clothing.

Once the reoccurring people have been identified, the program instructions direct the computing device to scan an unedited image to detect people in the image (step 620). Detecting people in the image includes constructing a person mask to locate people in the image. In some embodiments, constructing the person mask includes locating regions of pixels in the image that include a person, wherein each person mask includes at least one person. In other embodiments, scanning the image further includes constructing a subject mask to identify the subject of the photo. The overlap between the subject mask and each of the person masks is measured to determine if one or more of the person masks include the subject of the photo. A person identified as a subject of the photo is classified as a known person. In further embodiments, identifying people includes performing facial recognition on each identified person.

Once every person in the photo is located and the person mask is constructed, the program instructions direct the computing system to determine if any reoccurring people appear in the image based on the machine learning results (step 630). In some embodiments, determining if any reoccurring people are in the image includes cross referencing the facial recognition results with the personal identifiers found by the machine learning engine. In the event that a person is determined to not be a reoccurring person, or the person is determined to not be the subject of the photo, the person is marked for removal.

After any or all individuals in the image have been marked for removal, the program instructions direct the computing device to automatically remove all non-reoccurring individuals from the image (step 640). Removing the non-reoccurring individuals includes editing out person masks that include a non-reoccurring person or a person determined to not be the subject of the photo. In some examples, removing the non-reoccurring people includes cropping the image, or blurring areas of the image that include non-reoccurring people. In further examples, removing the non-reoccurring people includes using a combination of editing out people, cropping the image, and blurring non-reoccurring people to edit the image.

Once removed, the program instructions direct the computing system to fill holes created by removing the non-reoccurring people from the image (step 650). Hole filling includes replicating the background of the image and seamlessly integrating the replicated background into the background of the image. In some examples, if the photo is an image from a video, hole filling includes borrowing sections of the background from other frames of the video and replacing the holes with the borrowed section.

After the holes in the image have been filled, the program instructions direct the computing device to save the image (step 660). Distractor mitigation process 600 in some examples runs in the background and in an asynchronous manner. Distractor mitigation process 600 in some cases is configured to clean an entire photo library and is not limited by the number or type of photos cleaned.

Figure 7:
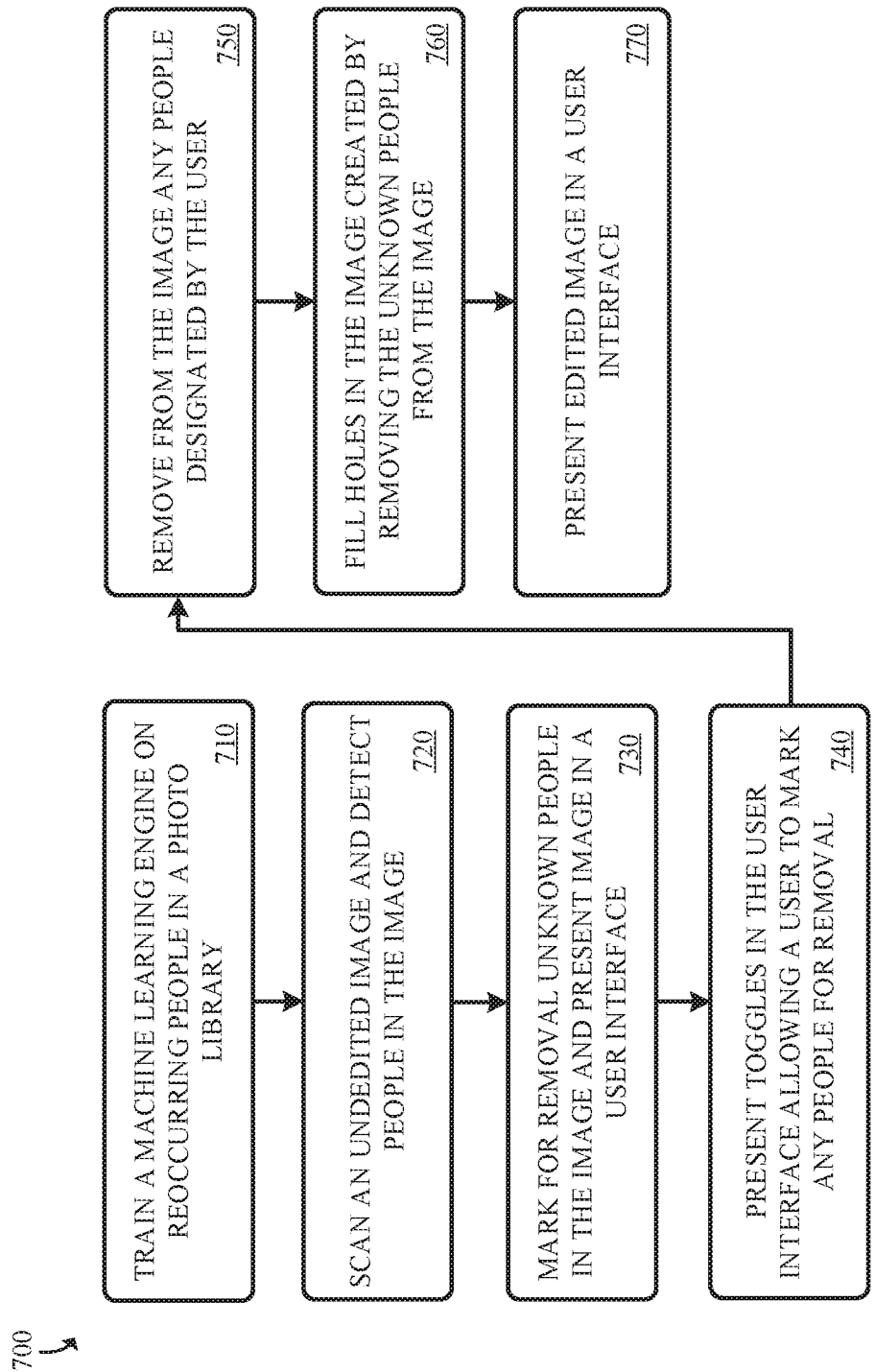
FIG. 7 illustrates a distractor mitigation process in an implementation.

FIG. 7 illustrates a semi-automatic photo editing process, represented by distractor mitigation process 700, according to one or more embodiments of the present technology. A computing apparatus operating distractor mitigation process 700 begins by training machine learning engine (e.g., photo analysis engine 310) on a photo library (e.g., photo library 340) to identify reoccurring people in photos (step 710).

Once the reoccurring people have been identified by the machine learning engine, an unedited image is scanned to detect all people in the image (step 720). In some examples, scanning the image includes utilizing a photo editing program (e.g., photo editing system 320) to locate regions of the image that include people. Once each person in the image is found, the photo editing program determines if any known individuals appear in the image based at least in part on the machine learning results. In some embodiments, the photo editing program also determines the subject of the image and subsequently marks this person as a known person.

Any person not identified as a known person is automatically marked for removal and the marked image is presented in a user interface (step 730). Marking unknown individuals for removal includes highlighting each identified person in the image and labeling each person as either known or unknown.

The user interface (e.g., user interface 330) then presents toggles that allow a user to mark or confirm people for removal (step 740). In some embodiments, the toggles include options for the user to reclassify people erroneously marked for removal or erroneously marked for keeping.

In further embodiments, the user interface includes one or more menus or toolbars that allow the user to customize the method of photo editing. For example, a menu in some examples includes photo editing options for hole filling, cropping, blurring, or camouflaging any unknown people present in the image. The user interface also includes tooltips which provide recommendations on which photo editing option to select.

Once the user confirms which individuals to edit out of the image, the photo editing program removes all people designated by the user according to the photo editing method selected by the user (step 750). After removing or mitigating the presence of unwanted people from the image, and after filling the holes created by the editing process (step 760), the user interface presents the edited image for review by the user (step 770). The user interface in some scenarios includes undo or retry functions to allow the user to re-edit the image, in the event that the editing results are unsatisfactory.

Figure 8A:
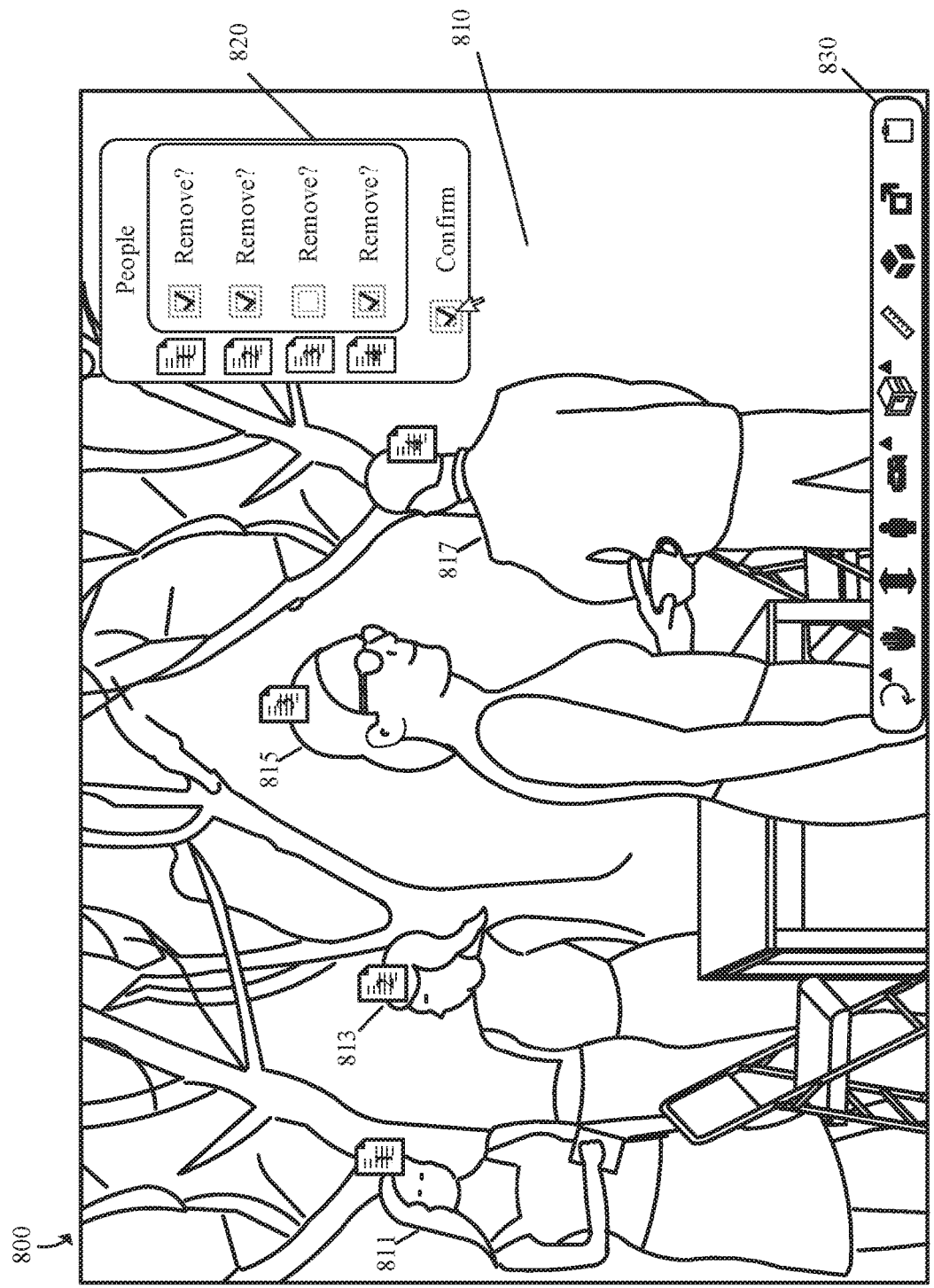
FIGS. 8A-8C illustrate an exemplary user experience in an implementation.
Figure 8B:
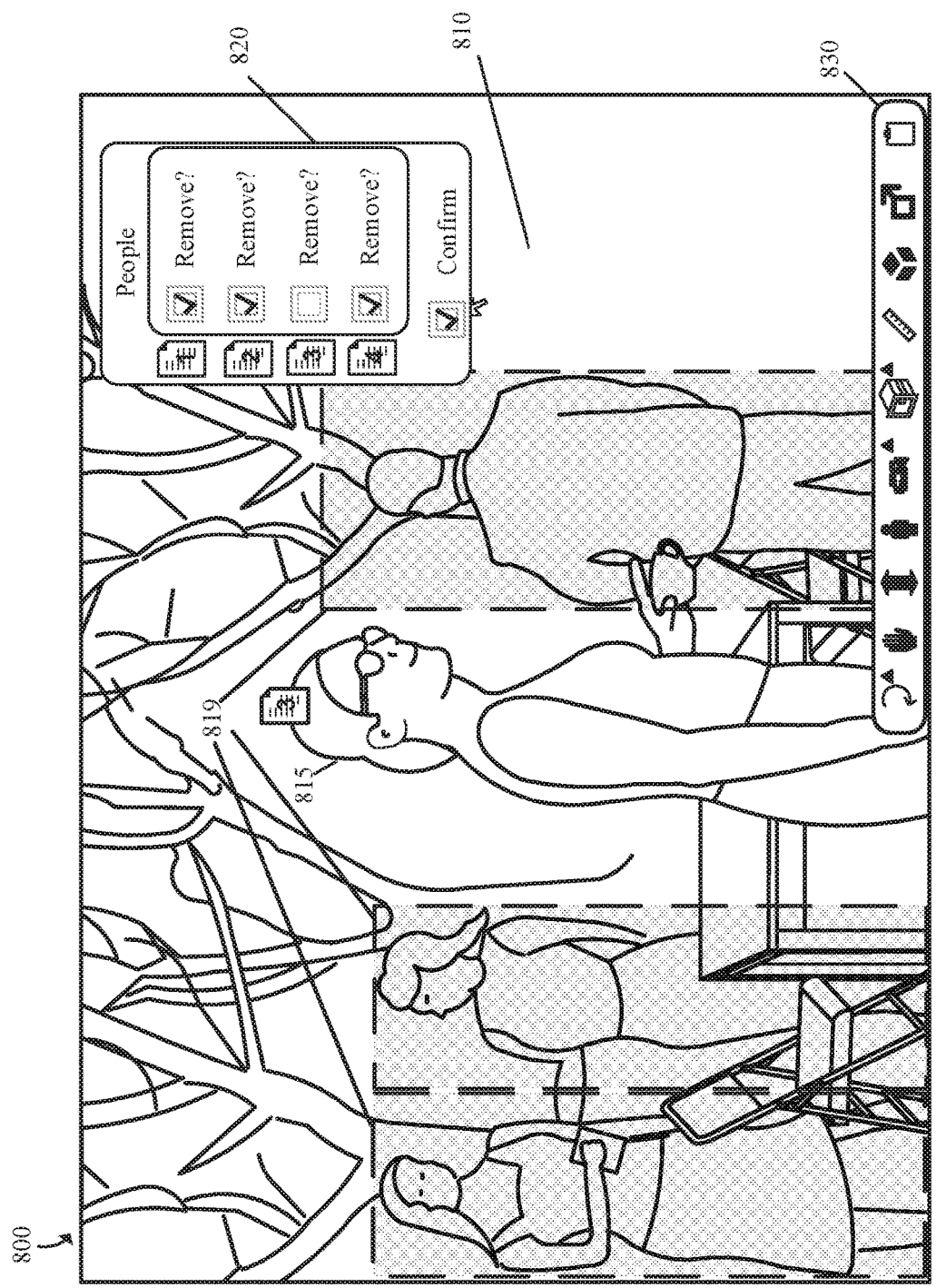
Figure 8C:
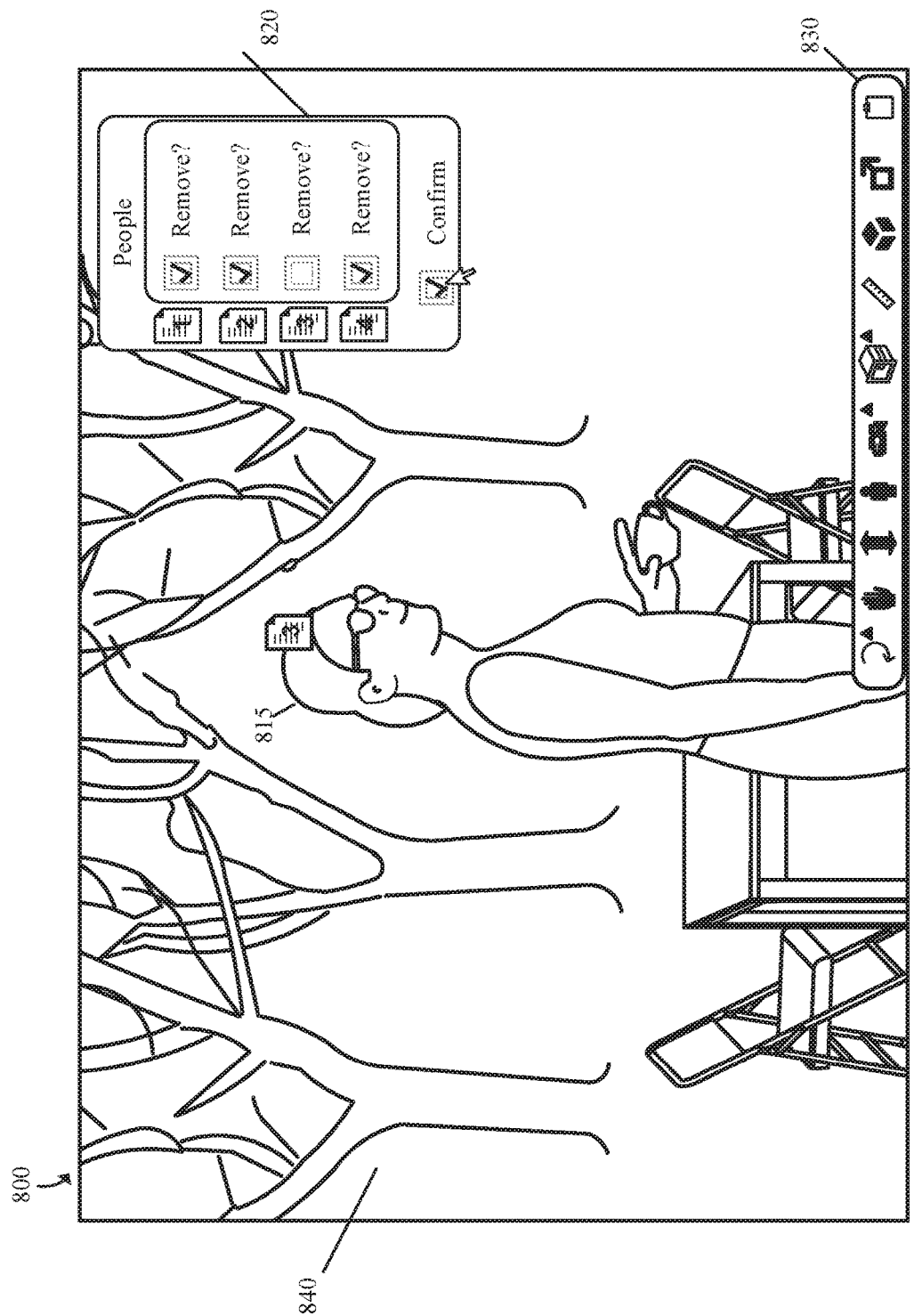

FIGS. 8A-8C illustrate a user experience according to one or more embodiments of the present technology. FIG. 8A includes user interface 800 which further includes image 810, edit manager 820, and toolbar 830. User interface 800 is implemented and displayed on a suitable computing device with peripherals such as a monitor, screen, and the like. In some examples, user interface 800 represents a user interface for a photo editing program with automatic photo editing capabilities.

Image 810 includes identified individuals 811, 813, 815, and 817. Each of the identified individuals is marked with an identifier signaling that a photo editing program has identified the user for removal (shown here as "1", "2", "3", and "4"). Edit manager 820 includes options that allow a user to select which of identified individuals 811, 813, 815, and 817 to remove from the image. Each option of edit manager 820 corresponds to an identified individual of identified individuals 811, 813, 815, and 817. Upon confirming which of identified individuals 811, 813, 815, and 817 to remove, a user confirms the selection using edit manager 820 to initiate the editing of a photo.

In some examples, the user interface recommends one or more options of edit manager 820 by preselecting the options. A user then is able to change the recommendations by selecting the toggles of edit manager 820. User interface 800 is not limited by a number of images that can be presented. For example, user interface 800 in some examples includes multiple layers, each layer corresponding to an edited or unedited image. A user then scrolls through each of the multiple layers to access different images.

Toolbar 830 includes a variety of additional photo editing tools available to the user. The additional photo editing tools include, but are not limited to, tooltip functions, edit type functions, photo import/export functions, edit mode functions, or other types of photo editing related functions. It should be appreciated that the type and number of additional editing tools is not limited. In some embodiments, tooltip functions provide a user with recommendations on the types of edits that can be made to an image or information on how to perform any action within user interface 800. The tooltip functions are triggered by a choice command or a contextual recommendation. In other embodiments, edit type functions include options that control the mode of operation when editing the photo. For example, the edit type functions include options to perform automatic hole filling, automatic cropping, automatic blurring, or automatic camouflaging, in addition to similar functions. User interface 800 presents recommendations on the type of edit to be made for an image in the form of one or more tooltips. In some examples, the recommendation are based on the size, orientation, or location of identified individuals 811, 813, 815, and 817. In further embodiments, the edit mode function allows the user to select various automated features. In some examples, the edit mode function allows a user to select a fully automated mode which can automatically edit the photo without user input and return one or more edited photos to the user. The user then selects which of the automated results to save as the photo.

FIG. 8B illustrates user interface 800 that appears after a selection to edit image 810 by a user. User interface 800 includes image 810, identified individuals 815, image holes 819, edit manager 820, and toolbar 830. Each image hole of image holes 819 corresponds to an identified individual of identified individuals 811, 813, and 817. Image holes 819 are created by the photo editing program during the modification of image 810. It should be noted that user interface 800 does not necessarily show image holes 819 during normal operation. Nonetheless, image holes 819 are shown here for illustrative purposes. In some embodiments, a photo editing program is used to identify a region on the image which includes an unwanted person and can then remove the region from the image to eliminate the unwanted person. After removal, holes created by the photo editing (shown here as image holes 819) are filled. Hole filling includes recreating the background of the original image obscured by any of the unwanted people in the image.

FIG. 8C shows user interface 800 with edited image 840. Edited image 840 shows the results of automated photo editing initiated by a user on image 810. Identified individuals 811, 813, and 817 have been removed and image holes 819 have been filled in. A user optionally uses toolbar 830 to undo any results of edited image 840.

Various embodiments in the preceding discussion relate generally to the removal of tourists or other unwanted individuals from photos. In some embodiments, an automatic photo editing system provides for person removal, where the system understands the semantics of images, including friends and family of a user. The photo editing system identifies all people in an input photo and generates masks for each person. In some examples, a mask is a region of a photograph that encompasses a person in the photo. The photo editing system utilizes object detection and auto selection technology such as that of Photoshop Elements©, in some examples.

Once all individuals present in the image are identified, the photo editing system selects a subset of the individuals as unwanted individuals to be removed. In some examples, the photo editing system classifies each person as "keep" or "remove" by identifying the subject of the photo and performing facial recognition on each person in the photo. Once each unwanted person has been identified and removed, the system can seamlessly fill the areas where the unwanted individuals resided. Each of these steps are performed automatically given an input image and an output image is automatically produced wherein the unwanted individuals are removed from the photo. Given access to a user's photo album, the photo editing system utilizes machine learning techniques to automatically learn to identify the user and the user's friends and family so that decisions about which people to keep and which people to remove are personalized for each user.

An example implementation of how to combine subject selection and facial recognition to classify individuals in images to keep or remove is as follows. The photo editing system creates a person mask to identify each person in the photo and a subject mask to identify the subject of the photo. If the person mask overlaps with the subject mask, the photo editing system determines to keep the person. Otherwise, the photo editing system determines to remove the person from the image. If a face is not detected during person detection, then subject identification is used to determine if the person should be kept in the photo. If a face is detected at the expected location within a person detection mask and face recognition is enabled, then the final output is determined by the facial recognition result: the person is retained in the image if their face corresponds to a "known" person and is removed if their face corresponds to an "unknown" person.

A face is classified as "unknown" if it is not recognized as a known person in automatic analysis that determines which people to keep based on the frequency of their occurrence in a set of images. Optionally, the determination is made manually though user input with images of people to keep. If the number of pixels in a face detection is below a pixel number threshold or the pixels inside the face detection rectangle are too blurry, then the result of classifying that face as known or unknown is considered not sufficiently reliable and the recognition cue is not used for such a face. It should be noted that the subject is not required to be a person. In some examples, the subject could be a landmark or other object and all people in the image could be marked for removal.

Other embodiments include incorporating additional cues besides subject selection and facial recognition to improve the automatic keep/remove classification of people. For example, the lack of a detected face within a person detection likely indicates that the person is not facing the camera and therefore should be removed. However, it could be that the face detector is incorrect and that a person's head is tilted away from the camera a little too much and that person should be kept. Thus, the photo editing system runs pose estimation to identify the pose of the body where certain body poses can indicate that the person is the subject of the photo or should be kept. Additionally, person recognition run by the automatic photo editing system determines aspects of a known person such as clothing, hair style, hair color, or other identifiers. If the person recognition identifies any known attributes, the photo editing system determine to keep the person.

In some examples, a face is detected with high confidence but there is no corresponding person detected. In that case, it is possible that the face detector is correct, but the person detector failed. The photo editing system learns a mapping from a face rectangle to the corresponding person rectangle by using other pairs of face and person rectangles. The other pairs of face and person rectangles are used as input to a network which accepts a face rectangle, and a portion of the image contains the detected face, and then outputs a person prediction rectangle corresponding to the detected face. Regardless of which regression method is used to predict a person from a face, at test time, the photo editing system adds the predicted person detection and proceeds as-if it had been detected in the first place. The face detection is sometimes enabled to improve the person detection regardless of whether the system is operating in the personalized mode which uses face recognition as an additional cue to subject selection.

In other embodiments, the automatic photo editing system trains an artificial neural network to predict a person distractor map where at each pixel there is a probability score between 0 and 1 that the pixel is part of an unwanted person. The system feeds the neural network photos that have identified distractors to train the neural network. The system scores each person detection by measuring its overlap with the distractor map and the threshold to obtain classification from this cue. The same is done for a general distractor map prediction method which predicts people and other distracting areas to remove from the image. The system combines the results of the individual cues to develop an overall score and then determines the likelihood that any given object or person in the image is a distractor.

In other embodiments, the automatic photo editing system trains an unwanted person detector to output detection boxes for each unwanted person. The system trains the unwanted person detector by feeding the detector with images that include identified unwanted people. The system scores each person detection result based on its overlap with unwanted person detections either by measuring the overlap of the detection boxes of both detectors or measuring the overlap of the mask for a person detection and the masks for the unwanted people detections. The masks for the unwanted individuals are part of the prediction of the unwanted person detection. The combination of cues are hand crafted rules based on designers' knowledge of the properties of the individual cues or are a learned function to predict a final "keep" score based on the scores of the individual cues. For instance, a ground truth output of 0 indicates that the person should be removed and a ground truth output of 1 indicates that the person should be retained.

The photo editing system runs the automatic procedure on a collection of images one at a time to automatically clean a set of images instead of just one. In some embodiments, the photo editing system runs in the background, while in other embodiments the photo editing system is explicitly launched by a user, for example by right clicking on a directory or selection of images and then choosing a "Remove Tourists" option. In the latter case, the set of identified images are used to first determine which people appear repeatedly and to label the reoccurring people as "known" people. The cleaned version of a photo is saved with the same filename as the input photo thus overwriting the input photo, or as a different filename from the input photo to preserve the original photo in case of a failure by the automatic method. The new filename includes a suffix appended to the end of the filename to indicate that it has been created by the system and is not the original photo file.

In additional embodiments, the photo editing system is configured to operate in a semi-automatic mode. In the semi-automatic mode, instead of running hole filling after identifying the unwanted people, the photo editing system presents the automatic classification results to the user to modify before performing hole filling. For example, a user interface with a button group with items "keep" and "delete," with the initial selection determined by the automatic classification described above. If the automatic analysis made all the correct classifications, then the user would press the OK button, for example, to perform hole filling and to create the final result. If there are any errors in the keep/remove classification, the user first corrects those errors via the user interface and then press OK to compute the final result. A similar interface also corrects the "known" or "unknown" person prediction.

The automatic photo editing system in some examples, includes other operating modalities besides hole filling to improve a photo with unwanted people. One method to make the unwanted people less distracting is to remove the unwanted people completely using hole filling. Another way is to crop the photo to remove all or some of the unwanted people. In further embodiments, the photo editing system blurs the unwanted people instead of removing them completely from the image. The photo editing system further lowers the saliency of the unwanted people in the photo with other types of edits. The methods used to remove or reduce the prominence of unwanted people in the image are not limited by the examples provided herein. The final distractor reduction method in some examples is an option offered to the user in the user interface when in a semi-automated mode, for example, with a pulldown menu containing "remove," "crop," "blur," and "camouflage" options. Within the "remove" option, a sub-option for the hole filling method can be offered. The type of menu offered in the user interface is not limited by the description herein. In addition to the pulldown menu, the user interface also shows a list of previews of results using different ways of making the unwanted people less distracting to allow the user to choose the desired result.

The photo editing system in some examples further includes an "auto" option for the distractor reduction method to determine which distractor reduction method result in the best final photo. For example, removal is preferred if the removal method performs effectively on the given hole filling task. This determination is based on confidence measures if available when returned by individual methods. In contrast, the determination is determined by a hand coded method using expert or general knowledge about a particular technique. For example, certain hole filling methods work very well on small holes surrounded by a uniform texture. If an analysis of the hole size or its surroundings indicates that the hole filling task fits one of these two criteria, then the auto method chooses to perform removal using the most appropriate hole filling method.

If hole filling is determined to be ineffective for the given hole filling task, then other methods are considered by the photo editing system. If the photo editing system is using a fully automated mode of operation, different methods are selected for each of the different people to be removed. For example, if there is a large distractor person or part of a person against the border of the picture, then cropping out just that part of the photo is the preferred way to remove that person from the photo. Whether to use cropping is determined by the quality of the composition after the crop or the size of the remaining image (e.g., the system would not want to crop out so much of the image that the resulting image is too small). If removing or cropping does not produce a good result for distractor reduction of a given person, then blurring or a more general saliency-reducing editing method is considered.

The classification of whether a method produces a good result is achieved by running the method and then feeding the resultant image to a network which has been trained to assign an image quality score or to discriminate between real and fake images, for example. Another option is to have an "all" distractor reduction option which runs all the methods on all the people and allows the user to choose which technique to use on which person based on the results shown.

The photo editing system in some examples includes one or more tooltips to help users remove distracting individuals from photos. The tooltip is triggered by a choice command or a contextual recommendation. In an example, the tooltips include a "just do it" mode in which the results would overwrite the image picture with the modified photo with distracting individuals removed. If run within the context of a digital editing app with layers (whether invoked by a tooltip or not) the photo editing system returns a structured result in the layers that a user can easily edit to correct mistakes or to run a different distractor reduction technique. For example, the photo editing system provides a hole filled result at the bottom layer with all the people removed. The photo editing system then has one layer per person with the visibility for that layer determined by the initial automatic keep/remove results. If a person is incorrectly determined, the user turns off the visibility of that layer to fix the mistake. If a person is incorrectly classified as remove, then the user turns on the visibility of that layer to fix the mistake.

In further embodiments, the photo editing system operates on each frame of a video to remove unwanted people from a user's video. In such an application, the photo editing system offers multiple source hole filling methods which use content from other frames of the video to fill the unwanted person hole in a given frame. Such multiple source hole filling methods perform better in general for video since the methods effectively copy background from other frames which did not include the unwanted person. The photo editing system operates in real time to automatically compute the mask indicating what to remove in each frame. In some embodiments, the results of previous frames are used to determine results in the next frame, resulting in an output with coherent predictions across frames.

Various embodiments of the present technology provide for a wide range of technical effects, advantages, and/or improvements to computing systems and components. For example, various embodiments include one or more of the following technical effects, advantages, and/or improvements: 1) automatically removing unwanted people from a photo using a single input photo; 2) personalized removal of unwanted persons from photos by automatically learning a user and user's friends and family based on their photos; 3) multiple unwanted person detection cues are used to determine distractors and subjects in images for improving classification results; 4) operating in the background and asynchronously on a user's local photos to clean photos without user effort; 5) presenting a user interface that allows a user to select multiple operating modes for unwanted person removal; 6) operating while a user is taking a photo so that the photographer does not see unwanted persons when taking a photo; and/or 7) presenting the removal results to a user prior to removing individuals from the photo to allow the user to easily correct any mistakes created by the automatic photo editing.

Aspects and implementations of the automated and personalized photo editing system of the disclosure have been described in the general context of various steps and operations. A variety of these steps and operations are performed by hardware components or are embodied in computer-executable instructions, which cause a general-purpose or special-purpose processor (e.g., in a computer, server, or other computing device) programmed with the instructions to perform the steps or operations. For example, the steps or operations are performed by a combination of hardware, software, and/or firmware.

FIG. 9 illustrates computing system 900 that is representative of any system or collection of systems in which the various processes, programs, services, and scenarios disclosed herein are. Examples of computing system 900 include, but are not limited to, desktop computer, laptop computers, tablets, mobile phones, wearable computing devices, Internet of Things (IoT) devices, server computers, web servers, application servers, and any variation or combination thereof.

Computing system 900 is be implemented as a single apparatus, system, or device or in a distributed manner as multiple apparatuses, systems, or devices. Computing system 900 includes, but is not limited to, processing system 925, storage system 905, software 910, communication interface system 920, and user interface system 930 (optional). Processing system 925 is operatively coupled with storage system 905, communication interface system 920, and user interface system 930.

Processing system 925 loads and executes software 910 from storage system 905. Software 910 includes and implements distractor mitigation process 915, which is representative of the distractor mitigation processes discussed with respect to the preceding Figures. When executed by processing system 925, software 910 directs processing system 925 to operate as described herein for at least the various processes, operational scenarios, and sequences discussed in the foregoing implementations. Computing system 900 optionally includes additional devices, features, or functionality not discussed here for purposes of brevity.

Referring still to FIG. 9, processing system 925 includes a micro-processor and other circuitry that retrieves and executes software 910 from storage system 905. Processing system 925 is implemented within a single processing device or is distributed across multiple processing devices or sub-systems that cooperate in executing program instructions. Examples of processing system 925 include general purpose central processing units, graphical processing units, application specific processors, and logic devices, as well as any other type of processing device, combinations, or variations thereof.

Storage system 905 includes any computer readable storage media that is readable by processing system 925 and capable of storing software 910. Storage system 905 includes volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal. Storage system 905 is implemented as a single storage device or across multiple storage devices or sub-systems co-located or distributed relative to each other. Storage system 905 includes additional elements, such as a controller, capable of communicating with processing system 925 or possibly other systems.

Software 910 (including distractor mitigation process 915) is implemented in program instructions and among other functions, when executed by processing system 925, directs processing system 925 to operate as described with respect to the various operational scenarios, sequences, and processes illustrated herein. For example, software 910 includes program instructions for implementing an automatic photo editing process and distractor mitigation process as described herein.

In particular, the program instructions include various components or modules that cooperate or otherwise interact to carry out the various processes and operational scenarios described herein. The various components or modules are embodied in compiled or interpreted instructions, or in some other variation or combination of instructions. The various components or modules are executed in a synchronous or asynchronous manner, serially or in parallel, in a single threaded environment or multi-threaded, or in accordance with any other suitable execution paradigm, variation, or combination thereof. Software 910 in some examples includes additional processes, programs, or components, such as operating system software, virtualization software, or other application software. Software 910 in some examples also includes firmware or some other form of machine-readable processing instructions executable by processing system 925.

Software 910, when loaded into processing system 925 and executed, transform a suitable apparatus, system, or device (of which computing system 900 is representative) overall from a general-purpose computing system into a special-purpose computing system customized to automatically edit photos as described herein. Encoding software 910 on storage system 905 transforms the physical structure of storage system 905. The specific transformation of the physical structure depends on various factors in different implementations of this description. Examples of such factors include, but are not limited to, the technology used to implement the storage media of storage system 905 and whether the computer-storage media are characterized as primary or secondary storage, as well as other factors.

For example, if the computer readable storage media are implemented as semiconductor-based memory, software 910 transforms the physical state of the semiconductor memory when the program instructions are encoded therein, such as by transforming the state of transistors, capacitors, or other discrete circuit elements constituting the semiconductor memory. A similar transformation occurs with respect to magnetic or optical media. Other transformations of physical media are possible without departing from the scope of the present description, with the foregoing examples provided only to facilitate the present discussion.

Communication interface system 920 includes communication connections and devices that allow for communication with other computing systems (not shown) over communication networks (not shown). Examples of connections and devices that together allow for inter-system communication include network interface cards, antennas, power amplifiers, RF circuitry, transceivers, and other communication circuitry. The connections and devices communicate over communication media to exchange communications with other computing systems or networks of systems, such as metal, glass, air, or any other suitable communication media. The aforementioned media, connections, and devices are well known and need not be discussed at length here.

Communication between computing system 900 and other computing systems (not shown), occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The communication networks and protocols discussed above are well known and need not be discussed at length here.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above include combinations and variations to form multiple embodiments. As a result, the invention is not limited to the specific embodiments described above, but only by the claims and their equivalents.

What is claimed is:

1. A computer system comprising one or more processors and memory configured to provide computer program instructions to the one or more processors, the computer program instructions comprising:
    a salience module configured to direct the one or more processors to:
        generate a saliency map representing one or more salient regions of an image by applying a saliency filter at multiple scales, each pixel of the saliency map storing a saliency value that represents a measure of saliency of the pixel; and determine, based on the saliency value for each pixel in the saliency map corresponding to a detected person in the image, a salience cue representing an extent to which the detected person overlaps with the one or more salient regions; and a distractor mitigation module configured to direct the one or more processors to:

classify the detected person as an unwanted distractor based on one or more cues comprising the salience cue for the detected person; and based on classifying the detected person as the unwanted distractor, trigger a recommendation to remove the detected person from one or more versions of the image.

2. The computer system of claim 1, wherein the one or more cues comprise a recognition cue generated using facial recognition and indicative of whether the detected person is recognized as a reoccurring person based on a frequency of appearance in a set of images associated with an account.

3. The computer system of claim 1, wherein the one or more cues comprise a distractor cue indicative of a probability that the detected person is a distractor.

4. The computer system of claim 1, wherein the distractor mitigation module is configured to direct the one or more processors to:

determine that a face has not been detected within a second detected person in the image; and determine not to remove the second detected person from the image based on an estimated pose of the second detected person identifying the second detected person as a subject of the image, or based on detecting an attribute of the second detected person and recognizing the attribute as a known attribute of a known person in a set of images associated with an account.

5. The computer system of claim 1, wherein the distractor mitigation module is configured to direct the one or more processors to trigger a user interface to request input confirming or rejecting the recommendation to remove the detected person from the one or more versions of the image.

6. The computer system of claim 1, wherein the distractor mitigation module is configured to direct the one or more processors to remove recurring instances of the detected person from other images based on input confirming the recommendation to remove the detected person from the one or more versions of the image.

7. The computer system of claim 1, wherein the distractor mitigation module is configured to direct the one or more processors to remove the detected person from the one or more versions of the image based at least on replacing pixels associated with the detected person with new pixels.

8. A method comprising:

generating a mask of a detected person in an image;

generating a saliency map of an image by applying a saliency filter at multiple scales, each pixel of the saliency map storing a saliency value that represents a measure of saliency of the pixel;

determining, based on the saliency value for each pixel in the saliency map that falls within the mask of the detected person, a salience cue representing an extent to which the detected person overlaps with the one or more salient regions;

classifying the detected person as an unwanted distractor based on one or more cues comprising the salience cue for the detected person; and based on classifying the detected person as the unwanted distractor, triggering a recommendation to remove the detected person from one or more versions of the image.

9. The method of claim 8, wherein the one or more cues comprise a recognition cue generated using facial recognition and indicative of whether the detected person is recognized as a reoccurring person based on a frequency of appearance in a set of images associated with an account.

10. The method of claim 8, wherein the one or more cues comprise a distractor cue indicative of a probability that the detected person is a distractor.

11. The method of claim 8, further comprising:

determining that a face has not been detected within a second detected person in the image; and determining not to remove the second detected person from the image based on an estimated pose of the second detected person identifying the second detected person as a subject of the image, or based on detecting an attribute of the second detected person and recognizing the attribute as a known attribute of a known person in a set of images associated with an account.

12. The method of claim 8, further comprising triggering a user interface to request input confirming or rejecting the recommendation to remove the detected person from the one or more versions of the image.

13. The method of claim 8, further comprising removing recurring instances of the detected person from other images based on input confirming the recommendation to remove the detected person from the one or more versions of the image.

14. The method of claim 8, further comprising removing the detected person from the one or more versions of the image based on replacing pixels associated with the detected person with new pixels.

15. One or more computer storage media storing computer-useable instructions that, when used by one or more computing devices, cause the one or more computing devices to perform operations comprising:

generating a mask of a detected person in an image;

generating a saliency map representing one or more salient regions of an image by applying a saliency filter at multiple scales, each pixel of the saliency map storing a saliency value that represents a measure of saliency of the pixel;

determining, based on the saliency value for each pixel in the saliency map corresponding to the mask of the detected person, a salience cue representing an extent to which the detected person overlaps with the one or more salient regions;

classifying the detected person unwanted based on one or more cues comprising the salience cue for the detected person; and determining, based on classifying the detected person as unwanted, whether to trigger a recommendation to remove the detected person from one or more versions of the image.

16. The one or more computer storage media of claim 15, wherein the one or more cues comprise a recognition cue generated using facial recognition and indicative of whether the detected person is recognized as a reoccurring person based on a frequency of appearance in a set of images associated with an account.

17. The one or more computer storage media of claim 15, wherein the one or more cues comprise a distractor cue indicative of a probability that the detected person is a distractor.

18. The one or more computer storage media of claim 15, the operations further comprising:

determining that a face has not been detected within a second detected person in the image; and determining not to remove the second detected person from the image based on an estimated pose of the second detected person identifying the second detected person as a subject of the image, or based on detecting an attribute of the second detected person and recognizing the attribute as a known attribute of a known person in a set of images associated with an account.

19. The one or more computer storage media of claim 15, the operations further comprising triggering a user interface to request input confirming or rejecting the recommendation to remove the detected person from the one or more versions of the image.

20. The one or more computer storage media of claim 15, the operations further comprising replacing pixels associated with the detected person with new pixels that blend into a background of the image.

\* \* \* \* \*